UNITED STATES PATENT OFFICE.

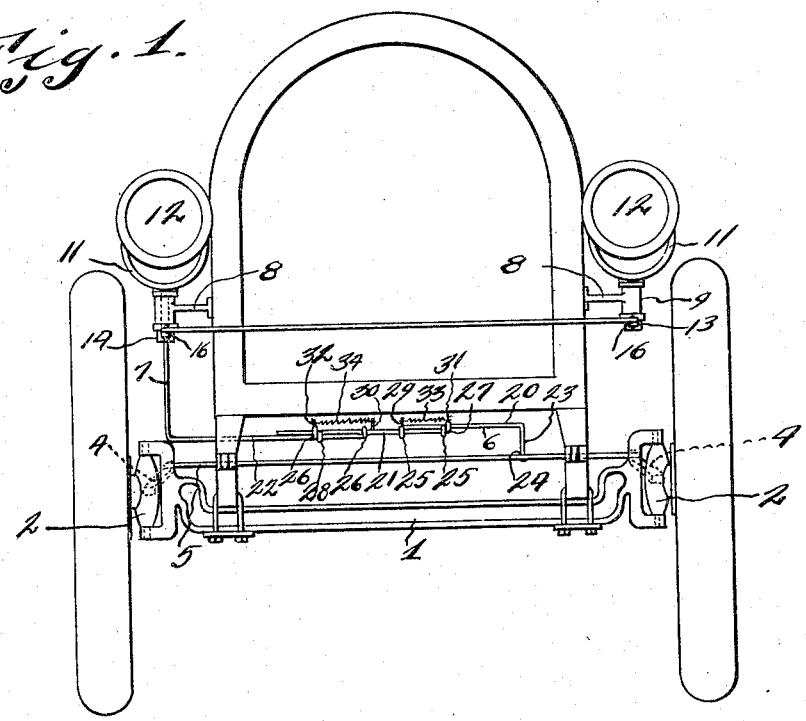

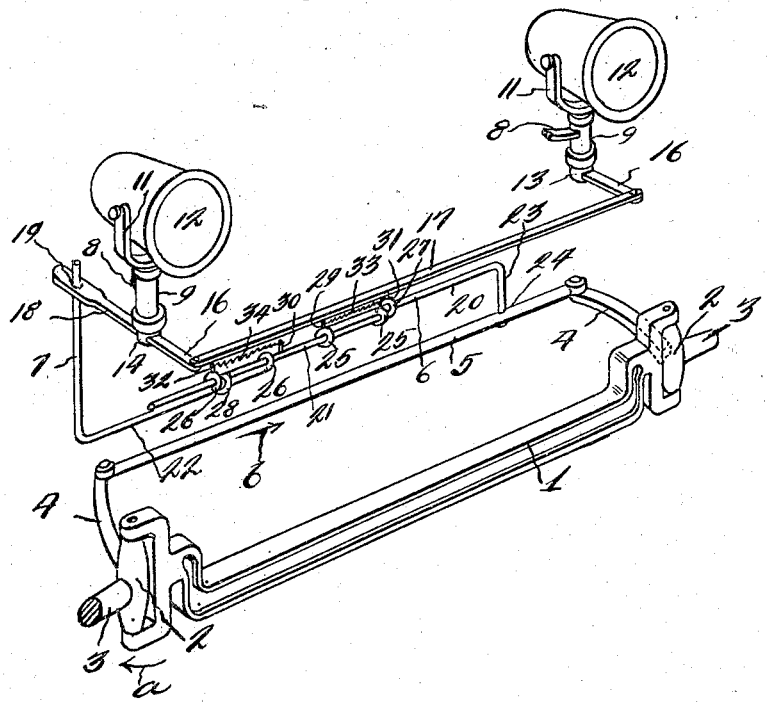
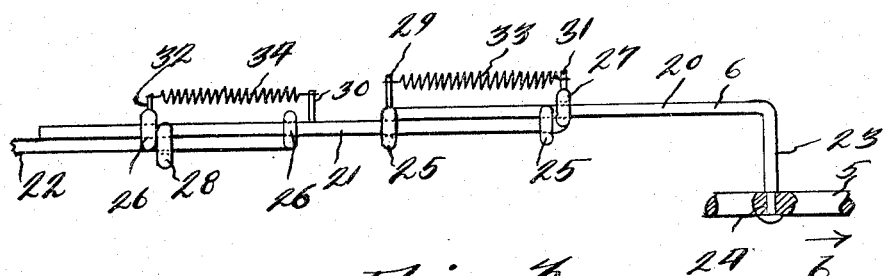

CHARLES R. McCLELLAN, OF PEPPERWOOD, CALIFORNIA.

DIRIGIBLE-LAMP MECHANISM.

1,228,457.  Specification of Letters Patent.  Patented June 5, 1917.

Application filed November 2, 1916. Serial No. 129,140.

*To all whom it may concern:*

Be it known that I, CHARLES R. MCCLELLAN, a citizen of the United States, residing at Pepperwood, in the county of Humboldt, State of California, have invented a new and useful Dirigible-Lamp Mechanism; and I do hereby declare the following to be a full, clear, and exact description of the invention, such as will enable others skilled in the art to which it appertains to make and use the same.

This invention relates to an improved dirigible lamp mechanism for automobiles, and one of the objects of the invention is to provide a mechanism of this kind, which, when the front wheels of the automobile turn in one direction the lamps will correspondingly turn.

A further object of the invention is to provide means, whereby should the lamps bind, the connections between the lamps and knuckle hubs will yield, thereby avoiding any breakage in the connections.

One of the features of construction is to provide a sectional rod carried by the connecting rod of the arms of the knuckle hubs, and an arm of one of the lamps, said rod having its sections provided with yieldable parts, whereby the front wheels may turn, should the lamps bind.

In practical fields the details of construction may necessitate alterations falling within the scope of what is claimed.

The invention comprises further features and combination of parts as hereinafter set forth shown in the drawings and claimed.

In the drawings:—

Figure 1 is a view in front elevation of an automobile, showing the dirigible lamp mechanism applied thereto;

Fig. 2 is a detail perspective view of the lamp mechanism detached.

Fig. 3 is an enlarged detail view of a yieldable connection between the sections of a rod which is connected to an arm of one of the lamps.

Fig. 4 is a detail sectional view through one of the lamp brackets.

Referring more especially to the drawing 1 designates the front axle of an automobile, which is provided with the usual knuckle hub 2 having the stub axles 3 for the front wheels. The knuckle hubs have rearwardly extending arms 4, and 5 denotes the connecting rod connecting the arms 4. Connected to the rod 5 and rising upwardly therefrom and extending laterally is a rod 6, the outer end portion of which terminates in an upright part 7. The usual brackets 8 are secured to the opposite sides of the hood of the automobile, and extending vertically through the cylindrical parts 9 of said brackets 8 are the stems 10 of the lamp brackets 11, which support the lamps 12. Collars 13 and 14 are secured upon the lower ends of the stems 10 by the pins 15. The collars 13 and 14 are provided with forwardly extending arms 16, which are connected by the bar 17. However, the collar 14 has a rearwardly extending arm 18, in to an aperture 19 of which, the upright part 7 of the rod 6 extends. The rod 6 consists of the three sections 20, 21, and 22, the section 22 has the upright part 7, while the section 20 has a downwardly extending part 23, which is pivoted at 24 to the connecting rod 5. The adjacent ends of the sections 20 and 22 have two sets of eyes 25 and 26, through which the section 21 extends, thereby coupling the sections. One end of the section 21 terminates in eye 27 which surrounds the section 20 and abuts upon the outer portion of the outer most eye 25, thereby further coupling the sections. Near the other end of the section 21 an eye 28 is formed to surround the section 22 and abut the inner portion of the eye 26 of the section 22, whereby the sections are additionally coupled. Rising upwardly from the inner most eyes 25 and 26 are pins 29 and 30, and rising upwardly from the outermost eyes 27 and 28 are pins 31 and 32. A spring 33 connects the pin 31 and the pin 29, and a similar spring 34 connects the pin 30 and the pin 32. It is to be noted that when the front wheels of the automobile turn to the right as indicated by the arrow $a$ in Fig. 2, the rod 5 will move in the direction of the arrow $b$, as shown in Figs. 2 and 3. In this case one of the eyes 25 of the section 20 of the rod 6 will abut the eye 27, thereby pull upon the section 21, which will cause the spring 34 to stretch slightly, but at the same time will pull upon the section 22, and turn the lamps according to the direction of the wheels. A reverse movement of the rod 5, will cause the spring 33 to stretch slightly, but in this case the section 22 of the rod will push and turn the lamps.

The invention having been set forth what is claimed as new and useful is:—

In a dirigible lamp mechanism, the combination of a pair of lamp brackets, the stems of each of which having forwardly extending arms and a rod connecting said arms, one of the stems having a rearwardly extending arm, rearwardly extending arms carried by the knuckle hubs of the front axle, a rod connecting the rearwardly extending arms of the knuckle hubs, and a yieldable sectional rod connecting the connecting rod of the rearwardly extending arms of the knuckle hub and the rearwardly extending arm of the stem of one of the lamp brackets.

In testimony whereof I have signed my name to this specification in the presence of two subscribing witnesses.

CHARLES R. McCLELLAN.

Witnesses:
 JOHN BAXTER,
 ALEX E. AMEN.

Copies of this patent may be obtained for five cents each, by addressing the "Commissioner of Patents, Washington, D. C."